(12) United States Patent
Mori

(10) Patent No.: US 8,812,513 B2
(45) Date of Patent: Aug. 19, 2014

(54) HASH POINTER CHECKING FOR HIERARCHICAL DATABASE LOGICAL RELATIONSHIP

(75) Inventor: Shigeko Mori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 13/515,981

(22) PCT Filed: Nov. 16, 2010

(86) PCT No.: PCT/JP2010/070347
§ 371 (c)(1),
(2), (4) Date: Jun. 26, 2012

(87) PCT Pub. No.: WO2011/077858
PCT Pub. Date: Jun. 30, 2011

(65) Prior Publication Data
US 2013/0086005 A1  Apr. 4, 2013

(30) Foreign Application Priority Data
Dec. 25, 2009  (JP) .................. 2009-294273

(51) Int. Cl.
*G06F 17/30* (2006.01)
(52) U.S. Cl.
USPC ......................................... 707/747; 707/778
(58) Field of Classification Search
USPC ................................ 707/747, 778
See application file for complete search history.

(56) References Cited

U.S. PATENT DOCUMENTS

| 4,751,702 A | 6/1988 | Beier et al. |
| 5,155,678 A | 10/1992 | Fukumoto et al. |

(Continued)

FOREIGN PATENT DOCUMENTS

| JP | 5081110 | 4/1993 |
| JP | 6075840 | 3/1994 |

(Continued)

OTHER PUBLICATIONS

IBM, "Administration Guide: Database Manager," IMS, Version 9, SC18-7806-03; 1974,2007, pp. 1-647.

(Continued)

*Primary Examiner* — Kim Nguyen
(74) *Attorney, Agent, or Firm* — Cantor Colburn LLP; Terry Carroll

(57) ABSTRACT

A method of checking consistency of pointers in a hierarchical database includes reading segment information recorded on the hierarchical database and determining a type of each segment and pointer included in each segment. The method also includes extracting parent pointers and twin pointers from child segments and extracting a child pointer from the parent segment. The method also includes calculating a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments. The method further includes indicating a consistency error when the first hash value and the second hash value differ.

20 Claims, 6 Drawing Sheets

(56) References Cited

U.S. PATENT DOCUMENTS

| | | | |
|---|---|---|---|
| 5,359,720 | A | 10/1994 | Tamura et al. |
| 5,418,947 | A | 5/1995 | Hsu et al. |
| 5,694,569 | A | 12/1997 | Fischer |
| 5,724,538 | A | 3/1998 | Morris et al. |
| 5,778,387 | A | 7/1998 | Wilkerson et al. |
| 5,881,379 | A | 3/1999 | Beier et al. |
| 5,933,820 | A | 8/1999 | Beier et al. |
| 5,950,191 | A | 9/1999 | Schwartz |
| 6,052,799 | A | 4/2000 | Li et al. |
| 6,073,129 | A | 6/2000 | Levine et al. |
| 6,185,569 | B1 | 2/2001 | East et al. |
| 6,411,964 | B1 | 6/2002 | Iyer et al. |
| 6,430,626 | B1 | 8/2002 | Witkowski et al. |
| 6,516,380 | B2 | 2/2003 | Kenchammana-Hoskote et al. |
| 6,629,154 | B1 * | 9/2003 | Jones et al. .................... 719/330 |
| 6,792,418 | B1 | 9/2004 | Binnig et al. |
| 6,856,651 | B2 | 2/2005 | Singh |
| 7,085,787 | B2 | 8/2006 | Beier et al. |
| 7,107,258 | B2 | 9/2006 | Cheng et al. |
| 7,107,430 | B2 | 9/2006 | Grossman et al. |
| 7,133,884 | B1 | 11/2006 | Murley et al. |
| 7,193,874 | B1 | 3/2007 | Pereira et al. |
| 7,299,249 | B2 | 11/2007 | Mori et al. |
| 7,440,936 | B2 | 10/2008 | Mori |
| 7,444,496 | B2 | 10/2008 | Shiomi et al. |
| 7,483,920 | B2 | 1/2009 | Mori et al. |
| 7,619,623 | B2 * | 11/2009 | Hoppe et al. .................. 345/419 |
| 7,707,477 | B2 * | 4/2010 | Go et al. ....................... 714/758 |
| 8,108,365 | B2 | 1/2012 | Mori et al. |
| 8,176,052 | B2 * | 5/2012 | Inouye et al. ................. 707/741 |
| 8,370,315 | B1 * | 2/2013 | Efstathopoulos et al. .... 707/696 |
| 8,532,115 | B2 * | 9/2013 | Lynam et al. ............ 370/395.32 |
| 8,549,256 | B2 * | 10/2013 | Narad ............................... 712/3 |
| 2001/0047360 | A1 | 11/2001 | Huras et al. |
| 2002/0091675 | A1 | 7/2002 | Shimokawa et al. |
| 2004/0122842 | A1 | 6/2004 | Friske et al. |
| 2004/0148284 | A1 | 7/2004 | Baker |
| 2005/0076176 | A1 | 4/2005 | Takada et al. |
| 2005/0188207 | A1 | 8/2005 | Fujimoto et al. |
| 2005/0223043 | A1 | 10/2005 | Randal et al. |
| 2007/0043775 | A1 | 2/2007 | Mori et al. |
| 2007/0106703 | A1 | 5/2007 | Shiomi et al. |
| 2007/0118547 | A1 | 5/2007 | Gupta et al. |
| 2008/0162585 | A1 | 7/2008 | Takahashi |
| 2008/0313218 | A1 | 12/2008 | Takahashi |
| 2012/0096008 | A1 * | 4/2012 | Inouye et al. ................. 707/743 |

FOREIGN PATENT DOCUMENTS

| | | |
|---|---|---|
| JP | 6139124 | 5/1994 |
| JP | 6243011 | 9/1994 |
| JP | 08249222 A2 | 9/1996 |
| JP | 9006653 | 1/1997 |
| JP | 10312329 | 11/1998 |
| JP | 2001142765 | 5/2001 |
| JP | 2004013228 | 1/2004 |
| JP | 2004329661 A | 11/2004 |
| JP | 2005190047 | 7/2005 |
| JP | 2005291155 A | 10/2005 |
| JP | 2006139619 | 6/2006 |
| JP | 2006139619 A | 6/2006 |
| JP | 2007052583 A | 3/2007 |
| JP | 2007102461 B1 | 3/2007 |

OTHER PUBLICATIONS

IBM, "IMS High Performance Pointer Checker for z/OS," User's Guide vol. 1, Version 2, Release 1, IBM 2000, 2003, pp. 1-406.

PCT; ISR; International Application No. PCT/JP2010/070347; International Filing Date: Nov. 16, 2010; Date of Mailing: Nov. 30, 2010; 1 page.

PCT; ISR; International Application No. PCT/JP2010/070347; International Filing Date: Nov. 16, 2010; Mailed: Dec. 28, 2010; pp. 1-4.

International Search Report—Written Opinion 2; International Application No. PCT/JP2010/070347; PCT/ISA/220; International Filing Date: Nov. 16, 2010; Mailing Date: Dec. 28, 2010; pp. 1-3.

International Search Report—Written Opinion; International Application No. PCT/JP2010/070347; International Filing Date: Nov. 16, 2010; Mailing Date: Dec. 28, 2010; pp. 1-3.

Gottemukkala et al., "Relaxed Index Consistency for a Client-Server Database", 1996 IEEE, pp. 352-361.

Jantti et al., "The Complete IMS HALDB Guide—All You Need to Know to Manage HALDBs", IBM.com, Redbooks, Jun. 2003, pp. 1-328.

Oracle Database Concepts "Data Blocks, Extents, and Segments", Copyright Oracle Corp 2003, pp. 2-1 through 2-22.

Silberschatz et al., "Consistency in Hierarchical Database Systems" Journal of the Association for Computing Machinery, vol. 27, No. 1, Jan. 1980, pp. 72-80.

Woo et al., "An effective recovery under fuzzy checkpointing in main memory databases", Information and Software Technology 42, (2002), pp. 185-196.

\* cited by examiner

HASH POINTER CHECKING FOR HIERARCHICAL DATABASE LOGICAL RELATIONSHIP

PRIORITY

This is a U.S. national stage of application No. PCT/JP2010/070347, filed on Nov. 16, 2010. Priority under 35 U.S.C. §119(a) and 35 U.S.C. §365(b) is claimed from Japanese Patent Application No. 2009-294273, filed Dec. 25, 2009, and all the benefits accruing therefrom under 35 U.S.C. §119, the contents of which in its entirety are herein incorporated by reference.

BACKGROUND

The present invention relates to a system, method, and program for checking database consistency, and more specifically to a system, method, and program for checking consistency of pointers in a hierarchical database.

A hierarchical database such as IBM® IMS™ is provided with a high-speed pointer check function, called a hash check function, for checking database consistency. The hash check function, instead of directly comparing the values of pointers owned by individual segments recorded in the database with the relative byte addresses (RBAs) of target segments pointed to by the pointers, compares the sum of the values of the pointers with the sum of the RBAs of the target segments to check consistency therebetween.

The hash check function determines that consistency is found if both total values are the same, and determines that inconsistency is found if both total values are different. However, even if it is determined that inconsistency is found, it is not determined which pointer or RBA is incorrect only by using a hash check. Therefore, it is necessary to directly compare pointer values with RBAs for correct checking.

Apparently, the number of pointers and the number of target segments should be the same in order to make the hash check effective. That is, pointers and target segments should have one-to-one relationships. However, pointers and target segments may have n-to-one relationships depending on the type of pointer. This corresponds to the case where, for example, a plurality of child segments have parent pointers pointing to the same parent segment. In this case, the number of parent pointers is n (>1) while the number of parent segments, which are target segments, is one. Thus, a conventional hash check function does not make it possible to check the consistency of such parent pointers.

Therefore, it is an object of the present invention to provide a system, method, and program that can check the consistency of pointers using a correct hash check even if the number of pointers and the number of target segments pointed to by these pointers differ in a hierarchical database.

BRIEF SUMMARY

According to a first aspect of the present invention, there is provided a system for checking consistency of pointers in a hierarchical database, the system including a reading unit that reads segment information recorded on the hierarchical database. The system also includes a determination unit that determines a type of each segment and a type of a pointer included in each segment from the segment information read by the reading unit. The system further includes an extraction unit that, in accordance with a determination result of the determination unit, extracts from a plurality of child segments parent pointers pointing to the same parent segment and twin pointers each pointing to the next child segment one after another starting from a specific child segment among the plurality of child segments and extracts a child pointer from the parent segment, the child pointer pointing to the specific child segment. The system also includes a calculation unit that calculates a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments. The system further includes a checking unit that indicates a consistency error when the first hash value and the second hash value differ.

According to a second aspect of the present invention, there is provided a method for checking consistency of pointers in a hierarchical database by using a computer including a reading unit, a determination unit, an extraction unit, a calculation unit, and a checking unit. The method includes reading, by the reading unit, segment information recorded on the hierarchical database and determining, by the determination unit, a type of each segment and a type of a pointer included in each segment from the segment information read by the reading unit; in accordance with a determination result of the determination unit. The method also includes extracting, by the extraction unit, from a plurality of child segments, parent pointers pointing to the same parent segment and twin pointers each pointing to the next child segment one after another starting from a specific child segment among the plurality of child segments and extracting, by the extraction unit, a child pointer from the parent segment, the child pointer pointing to the specific child segment. The method further includes calculating, by the calculation unit, a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments. The method also includes indicating, by the checking unit, a consistency error when the first hash value and the second hash value differ.

According to a third aspect of the present invention, there is provided a computer program product for checking consistency of pointers in a hierarchical database, the computer program product including a tangible storage medium readable by a processing circuit and storing instructions for execution by the processing circuit for performing a method. The method includes reading segment information recorded on the hierarchical database and determining a type of each segment and a type of a pointer included in each segment from the segment information; in accordance with a determination result. The method also includes extracting from a plurality of child segments, parent pointers pointing to the same parent segment and twin pointers each pointing to the next child segment one after another starting from a specific child segment among the plurality of child segments and extracting a child pointer from the parent segment, the child pointer pointing to the specific child segment. The method further includes calculating a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments. The method also includes indicating a consistency error when the first hash value and the second hash value differ.

Additional features and advantages are realized through the techniques of the present invention. Other embodiments and aspects of the invention are described in detail herein and are considered a part of the claimed invention. For a better understanding of the invention with advantages and features, refer to the description and to the drawings.

DETAILED DESCRIPTION

An embodiment for carrying out the present invention (hereinafter referred to simply as an embodiment) will be described with reference to the drawings. The following description is merely exemplary in nature and is not intended to limit the present invention defined in the claims. For example, in one embodiment, IMS™ of International Business Machines Corporation may be used as an example of a hierarchical database. However, of course, an embodiment of the present invention can also be applied to any other hierarchical database.

Three types of pointers, namely, parent pointer, child pointer, and twin pointer, are used in embodiments of the present invention. As used herein, a parent pointer is a pointer that is one of the pointers included in a child segment and that points to the storage location address (for example, relative byte address RBA) of a parent segment. As used herein, a child pointer is a pointer that is one of the pointers included in a parent segment and that points to the storage location address of a specific child segment. If the specific child segment and other child segments are twins, the child segment pointed to by the child pointer is either the first child segment or the last child segment among these child segments (twin segments). As used herein, a twin pointer is a pointer that is one of the pointers included in a child segment and that points to the storage location address of the next or subsequent child segment in a plurality of child segments. If a specific child segment pointed to by a child pointer is the first child segment, each twin pointer points to the next child segment one after another in the forward direction starting from the first child segment. Alternatively, if a specific child segment pointed to by a child pointer is the last child segment, each twin pointer points to the next child segment one after another in the reverse direction starting from the last child segment.

Figure 1:
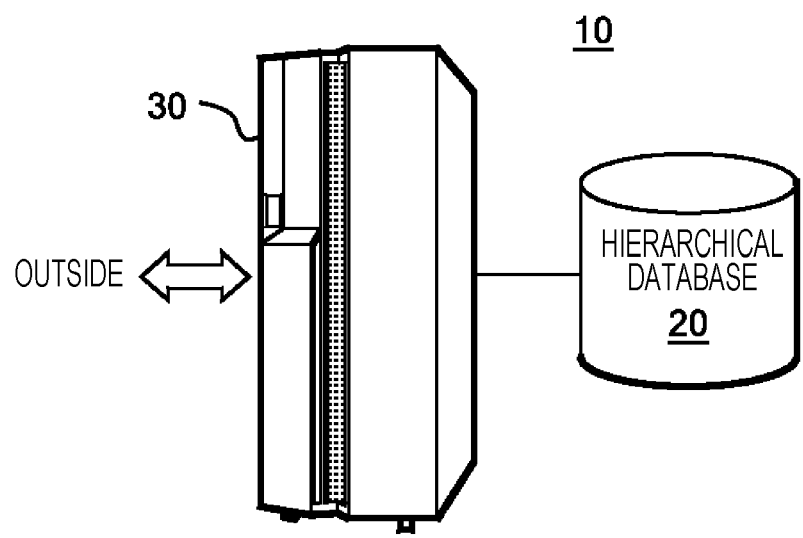
FIG. 1 is a diagram illustrating an overview of a database system contemplated by the present invention.

FIG. 1 illustrates an overview of a database system 10 contemplated by the present invention. The database system 10 includes a hierarchical database 20, and a database management system 30 according to the present invention.

Figure 2:
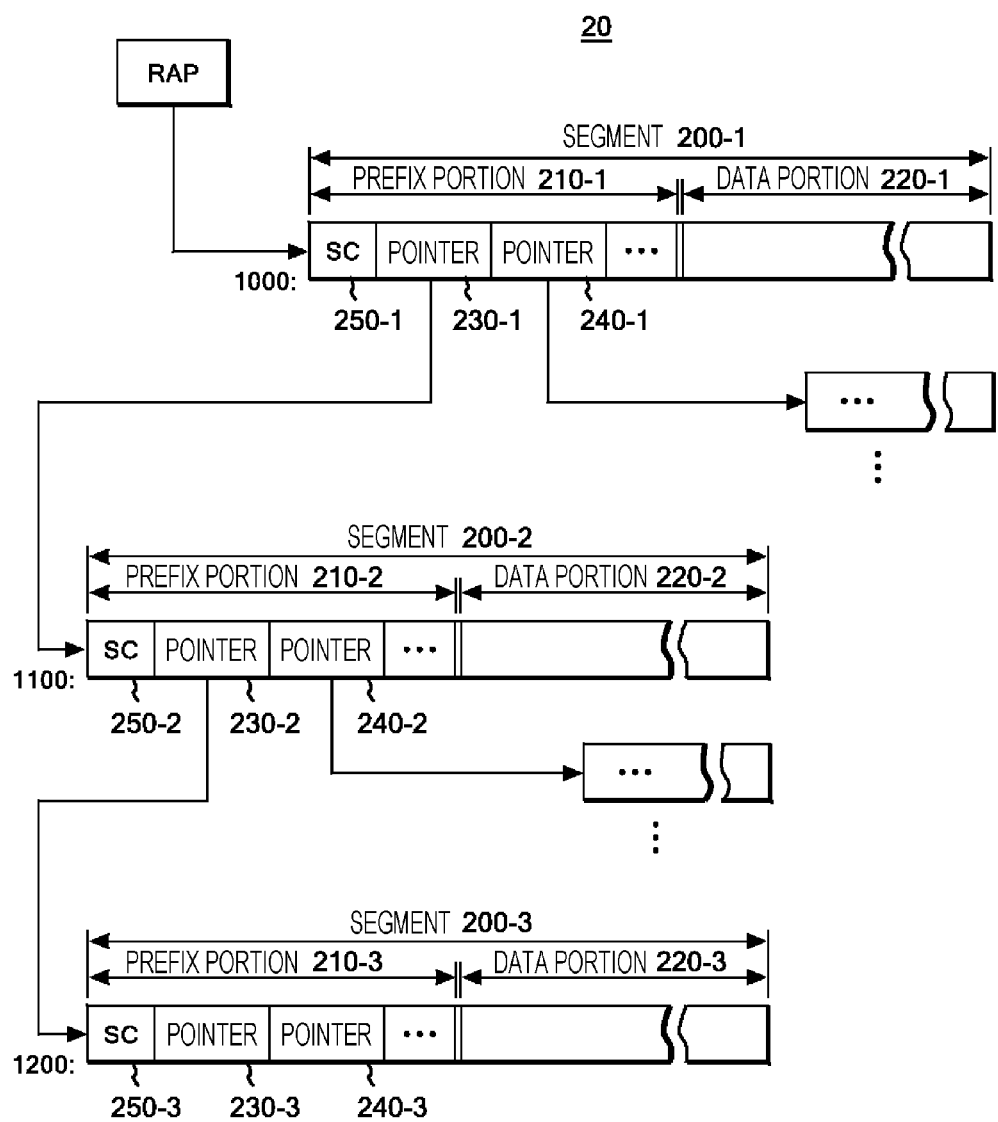
FIG. 2 is a block diagram illustrating an example configuration of a hierarchical database included in the database system in FIG. 1.

As illustrated in FIG. 2, the hierarchical database 20 records a plurality of segments typified by segments 200-1 to 200-3. In the illustrated example, the segment 200-1 is a root segment, and can be specified by a root anchor point (RAP). The segment 200-1 includes a prefix portion 210-1 and a data portion 220-1. The storage location address of the segment 200-1 is 1000. Here, the storage location address refers to, for example, the position of a starting address (relative byte address: RBA) of the segment 200-1 relative to a predetermined reference address in the hierarchical database 20. The prefix portion 210-1 includes a pointer 230-1 pointing to the storage location address of the segment 200-2, or 1100, a pointer 240-1 pointing to the storage location address of another segment, and a segment code (SC) 250-1. The segment code 250-1 is a number assigned in order, starting from the root segment, to specify a segment type. In the illustrated example, since the segment 200-1 is the root segment, the segment code 250-1 is set to, for example, "01".

Like the segment 200-1, the segment 200-2 includes a prefix portion 210-2 and a data portion 220-2. The prefix portion 210-2 includes a pointer 230-2 pointing to the storage location address of the segment 200-3, or 1200, a pointer 240-2 pointing to the storage location address of still another segment, and a segment code 250-2. Since the segment 200-2 is a segment subsequent to (dependent segment of) the root segment, the segment code 250-2 is set to, for example, "02".

The segment 200-3 also includes a prefix portion 210-3 and a data portion 220-3. The segment 200-3 is located at the end of the series of hierarchical relationships starting from the segment 200-1. Therefore, the prefix portion 210-3 has no pointer pointing to a lower level segment but only has a pointer pointing to a twin that shares the same parent. In actuality, the prefix portion 210-3 may include, as a pointer 240-3, predetermined data indicating no address (for example, Null). In addition, the prefix portion 210-3 further has a segment code 250-3 which is set to, for example, "03".

FIG. 2 illustrates a normal case where individual pointers and target segments pointed to by the pointers have one-to-one relationships, and a conventional hash check can be applied. However, as described above, n-to-one relationships may occur depending on the situation. This example is illustrated in FIG. 3.

Figure 3:
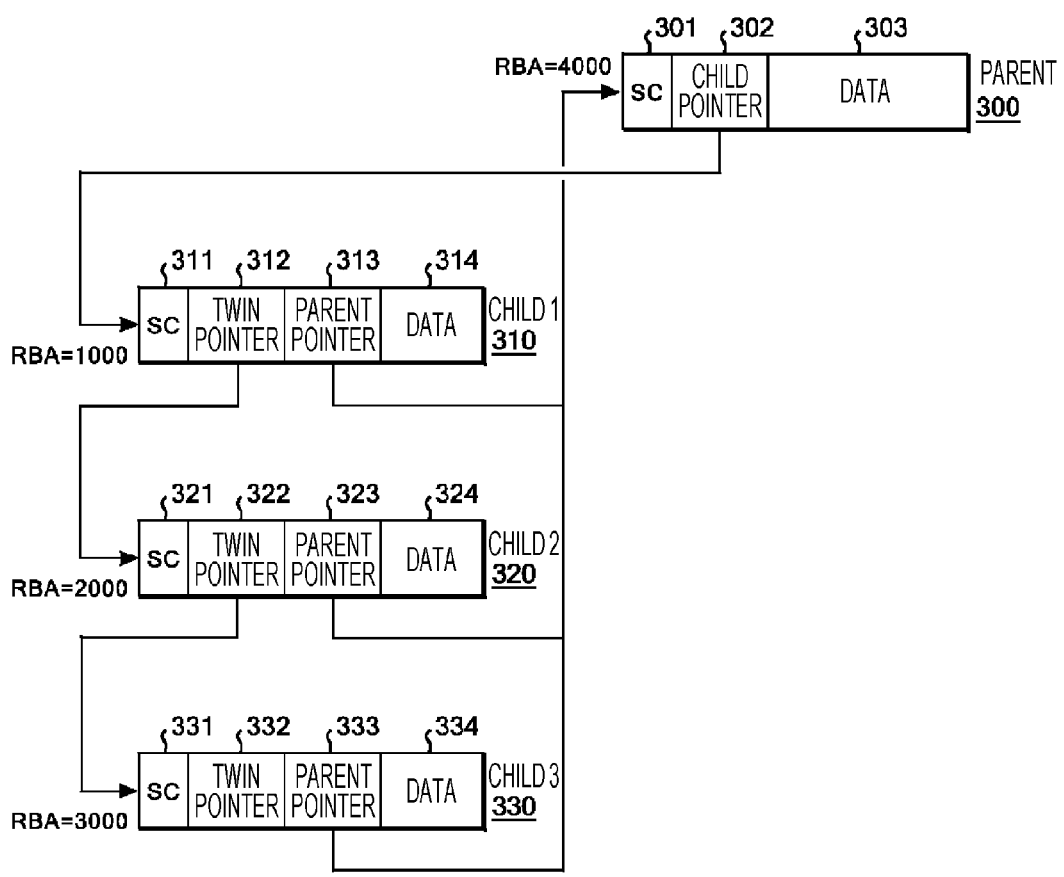
FIG. 3 is a block diagram illustrating an example configuration of a hierarchical database in which a plurality of child segments have parent pointers pointing to the same parent segment.

FIG. 3 illustrates an example configuration of parent-child relationships including a single parent segment 300, and a first child segment 310 (child 1), a second child segment 320 (child 2), and a third child segment 330 (child 3), each of which has a parent pointer pointing to the parent segment 300. The parent segment 300 includes a segment code (SC) 301 representing a segment type, a child pointer 302 pointing to a specific child segment among the child segments 310, 320, and 330, and data 303. In the example in FIG. 3, the specific child segment pointed to by the child pointer 302 is the first child segment 310 among the three child segments 310, 320, and 330. The segment code 301 of the parent segment 300 is set to, for example, "01" at the time of creation of the parent segment.

The first child segment 310 includes a segment code 311, a twin pointer 312 pointing to the next child segment 320, a parent pointer 313 pointing to the parent segment 300, and data 314. Similarly, the second child segment 320 includes a segment code 321, a twin pointer 322 pointing to the next child segment 330, a parent pointer 323 pointing to the parent segment 300, and data 324. Further, the third child segment 330 includes a segment code 331, a twin pointer 332, a parent pointer 333, and data 334.

The segment codes 311, 321, and 331 are set to the same value (for example, "02") representing twins because the corresponding child segments have the segment 300 as the parent.

In the example in FIG. 3, the twin pointers included in the respective child segments are each configured to point to the next child segment in the forward direction starting from the first child segment 310. The last child segment 330 has no subsequent child segment, and therefore the twin pointer 332 is set to, for example, null (all zeros).

In IBM® IMS™, the child pointer 302 included in the parent segment 300 may point to the last child segment 330. In this case, the twin pointers included in the respective child segments each point to the next child segment in the direction opposite to that described above. That is, the twin pointer 332 of the last child segment 330 points to the preceding second child segment 320, and the twin pointer 322 of the second child segment 320 points to the first child segment 310. In this case, the twin pointer 312 of the first child segment 310 is set to null.

In FIG. 3, the RBA indicated on the left side of each segment represents a relative byte address indicating the storage location address (in the example in FIG. 3, the start position) of the segment; however, the storage location address is not limited to the RBA and may also be any other address such as an absolute address. In addition, only the fields necessary to understand the present invention are illustrated in FIG. 3. In actuality, however, each segment includes various fields other than those illustrated in FIG. 3. For example, there is a field called delete byte subsequent to the segment code SC, which includes a bit indicating whether the segment is invalid because it was deleted.

Of the various pointers illustrated in FIG. 3, each of the child pointer 302 and the twin pointers 312 and 322 has only one associated target segment. Thus, these pointers and target segments have one-to-one relationships, and therefore it is possible to check consistency using a conventional hash check. However, with regard to parent pointers, a single same parent segment 300 is a target segment for the three parent pointers 313, 323, and 333. Thus, the pointers and the target segment have a three-to-one relationship, and it is not possible to check consistency by using a conventional hash check.

In general, in a case where there is only one target segment for n pointers, the hash check of the pointers may be possible if n different expressions including the respective pointers hold. In the present invention, in terms of the fact that the following expressions hold unless a consistency error of pointers occurs in the example configuration of FIG. 3, a hash check is executed by combining an n-to-one pointer (parent pointer) with one-to-one pointers (child pointer and twin pointer).

$$f(\text{ADDR of parent, CP}) = f(\text{ADDR of child 1, PP of child 1}) \quad (1)$$

$$f(\text{PP of child 1, SP of child 1}) = f(\text{ADDR of child 2, PP of child 2}) \quad (2)$$

$$f(\text{PP of child 2, SP of child 2}) = f(\text{ADDR of child 3, PP of child 3}) \quad (3)$$

In the above expressions, ADDR denotes a storage location address (for example, RBA), CP denotes a child pointer, PP denotes a parent pointer, and SP denotes a twin pointer. In the above expressions, furthermore, f(A, B) represents a binomial operation whose operands are A and B. The binomial operation may be any arithmetic operation among addition (A+B), subtraction (A−B), multiplication (A×B), and division (A÷B). In the case of subtraction or division, the order of operands needs to be the same on the left side and the right side. That is, for example, if the value regarding the storage location address of the parent (the storage location address itself and the parent pointer) is operand A on the left side, the parent pointer should also be operand A on the right side.

In an actual database, a lot of combinations exist, each of which consists of one parent segment and a plurality of child segments as described above. If the total number of such combinations, that is, the total number of parent segments, is represented by n and the total number of child segments is represented by m, Expressions (1) to (3) above can be integrated as follows for all the parent-child relationships.

$$\Sigma 1 f(\text{ADDR of parent } i, \text{CP}) + \Sigma 2 f(\text{PP of child } j, \text{SP of child } j) = \Sigma 3 f(\text{ADDR of child } k, \text{PP of child } k) \quad (4)$$

In Expression (4), $\Sigma 1$ denotes accumulation of the values of the function f(ADDR of parent i, CP) a number of times equal to the number of parent segments n, that is, from parent 1 to parent n, $\Sigma 2$ denotes accumulation of the values of the function f(PP of child j, SP of child j) a number of times, excluding the last child segment in each combination of parent-child relationships (the total number is given by n−m), and $\Sigma 3$ denotes accumulation of the values of the function f(ADDR of child k, PP of child k) a number of times equal to the number of child segments m, that is, from child 1 to child m. The accumulation is executed by, for example, addition. The reason that the last child segment is excluded in $\Sigma 2$ is that the twin pointer SP of the last child segment (in the example in FIG. 3, the twin pointer 332) has no associated target segment. However, if the twin pointer SP of the last child segment has a value zero and if the binomial operation of f(PP of child i, SP of child i) is multiplication, $\Sigma 2$ may accumulate a number of times equal to the number of child segments m, as in $\Sigma 3$. By doing so, it is possible to eliminate the processing for excluding the last child segment. The term last child segment, as used herein, refers to the last child segment reached when following the twin pointers, and depends on which child segment the child pointer included in the parent segment points to.

Figure 4:
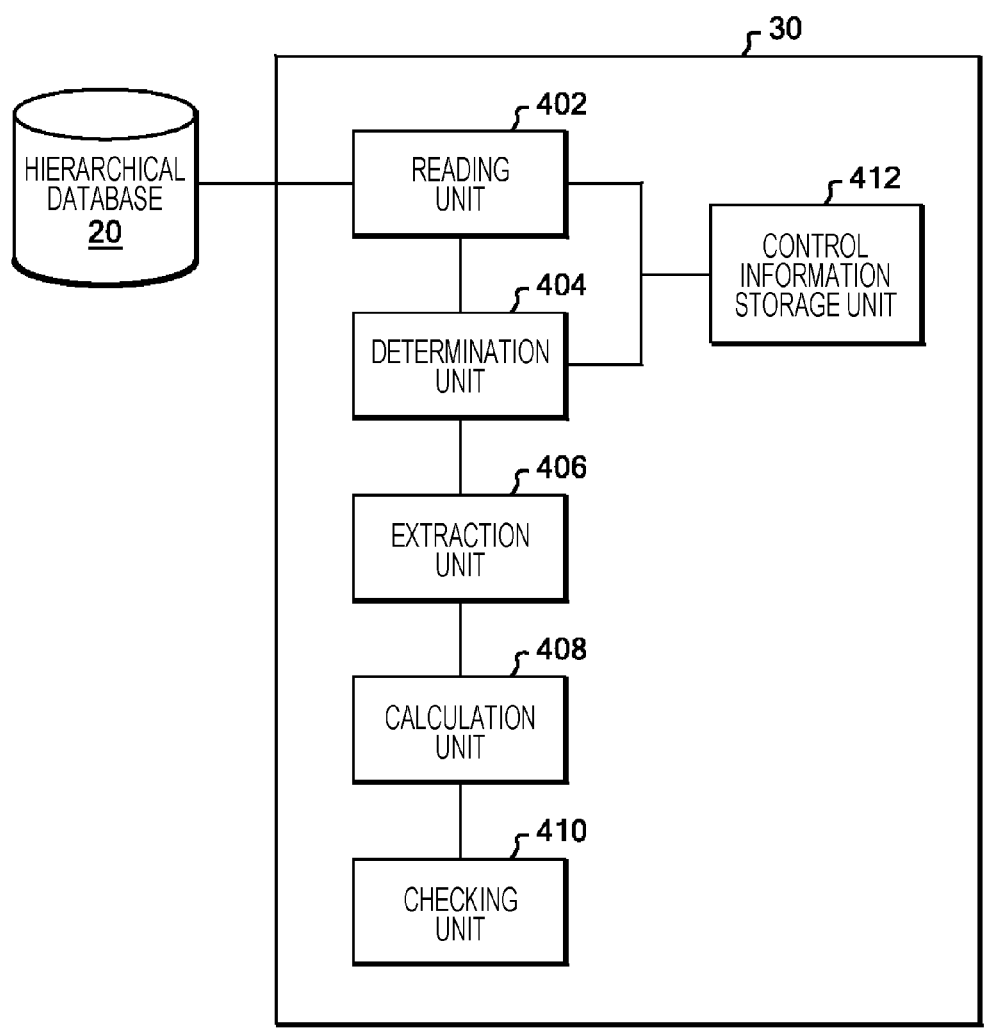
FIG. 4 is a block diagram illustrating an example functional configuration of a database management system according to the present invention.

FIG. 4 illustrates an example functional configuration of the database management system 30 that executes a hash check in accordance with Expression (4) above. The database management system 30 includes a reading unit 402 that reads segment information recorded on the hierarchical database 20, a determination unit 404 that determines the type of each segment and the type of a pointer included in each segment from the segment information read by the reading unit 402, an extraction unit 406 that, in accordance with a determination result of the determination unit 404, extracts from a plurality of child segments parent pointers pointing to the same parent segment and twin pointers each pointing to the next child segment one after another starting from a specific child segment among the plurality of child segments, and extracts a child pointer from the parent segment, the child pointer pointing to the specific child segment, a calculation unit 408 that calculates a first hash value by a combination of the storage location address of the parent segment and the value of the child pointer and a combination of the values of the parent pointers and the twin pointers included in the child segments, and a second hash value from a combination of the storage location addresses of the child segments and the values of the parent pointers included in the child segments, and a checking unit 410 that indicates a consistency error when the first hash value and the second hash value differ.

Next, the operation of the database management system 30 will be described with reference to a flowchart in FIG. 5.

First, in step S1, the reading unit 402 reads segments recorded on the hierarchical database 20 in order of the physical addresses of the segments. In describing the example in FIG. 3, if fours segments 300, 310, 320, and 330 are recorded on the hierarchical database 20, the reading unit 402 first reads the segment 310 in accordance with the physical addresses, and then reads the segments 320, 330, and 300 in turn. In IBM® IMS™, control information defining the physical structures of the segments recorded on the hierarchical database 20 is saved in a control information storage unit 412, and the reading unit 402 reads a segment by referring to the control information, and sends the read content to the determination unit 404. If the bit indicating that the segment is invalid is turned on in the "delete byte" field described above, the reading unit 402 discards the read content without sending it to the determination unit 404.

Then, in step S2, the determination unit 404 first accesses the control information saved in the control information storage unit 412 using the segment code (for example, SC 311) in the prefix portion of the segment sent from the reading unit 402. The control information includes information indicating, for each segment code, what type the corresponding segment is, what pointer the segment has, and where the position of the pointer is, and the determination unit 404 reads this information to determine the type of the segment and also the type of the pointer that the segment has. In this embodiment, the segment code 311 of the segment 310 read first by the reading unit 402 is "02", which indicates that the segment 310 is one of a plurality of children having the same parent pointer. The same applies to the segments 320 and 330. On the other hand, the segment code 301 of the segment 300 is "01", which indicates that the segment 300 has a child pointer pointing to a specific child segment.

Next, in step S3, the determination unit 404 determines from the control information whether or not the determined type of the segment indicates one of a plurality of children having the same parent pointer. If it is not correct, the process proceeds to step S4, in which it is determined whether or not the segment has a child pointer pointing to a specific child segment. If the determination result in step S3 is YES, the process proceeds to step S5, in which the extraction unit 406 extracts a parent pointer and a twin pointer that are determined by the determination unit 404 in step S2 and included in the child segment. If the determination result in step S4 is YES, the process proceeds to step S6, in which the extraction unit 406 extracts the child pointer that is determined by the determination unit 404 in step S2 and included in the parent segment.

After a parent pointer and a twin pointer are extracted in step S5, in step S7, the extraction unit 406 determines whether or not the child detected in step S3 is the last child among the plurality of children. This is possible by determining whether or not the twin pointer extracted in step S5 indicates zero. If the detected child is not the last child, the extraction unit 406 sends the parent pointer and twin pointer extracted in step S5 to the calculation unit 408. If the detected child is the last child, the process proceeds to step S9 without the above pointers being sent to the calculation unit 408.

Next, in step S8, the calculation unit 408 calculates a first hash value represented by the left side of Expression (4) above and a second hash value represented by the right side of Expression (4). As seen in Expression (4), the calculation unit 408 calculates a first hash value by a combination of the storage location address of a parent segment and the value of a child pointer and a combination of the values of a parent pointer and a twin pointer included in a child segment, and calculates a second hash value from a combination of the storage location address of a child segment and the value of a parent pointer included in the child segment. The combinations used here may be based on any operation among addition, subtraction, multiplication, and division; however all the combinations should be based on the same operation because hash values to be compared are calculated. That is, if a combination of the storage location address of a parent segment and the value of a child pointer is obtained by, for example, the addition of the storage location address of a parent segment and a child pointer value, all the other combinations are obtained by addition.

As described above, if the combinations are obtained by subtraction or division, the order of two operands to be combined needs to be the same for all the combinations. Alternatively, if the combinations are obtained by multiplication, the processing of excluding the last child segment (step S7) can be omitted.

Next, in step S9, it is determined whether or not the segment read by the reading unit 402 in step S1 is the last segment recorded on the hierarchical database 20. If the read segment is not the last segment, the process returns to step S1, and the reading unit 402 reads the subsequent segment. If the read segment is the last segment, the process proceeds to step S10, in which the checking unit 410 compares the first hash value and the second hash value calculated in step S8. If both match, in step S11, it is shown that consistency is found while, if both do not match, in step S12, it is shown that inconsistency is found.

If the checking unit 410 detects an inconsistency between the hash values in step S10, as is apparent from Expression (4), one of the storage location address of the parent segment, the storage location address of the child segment, the parent pointer, the child pointer, and the twin pointer is incorrect; it is not clear which one is incorrect. However, since the child pointer and the twin pointer have one-to-one relationships with their target segments, the conventional hash check function can be applied to these pointers separately.

Figure 5:
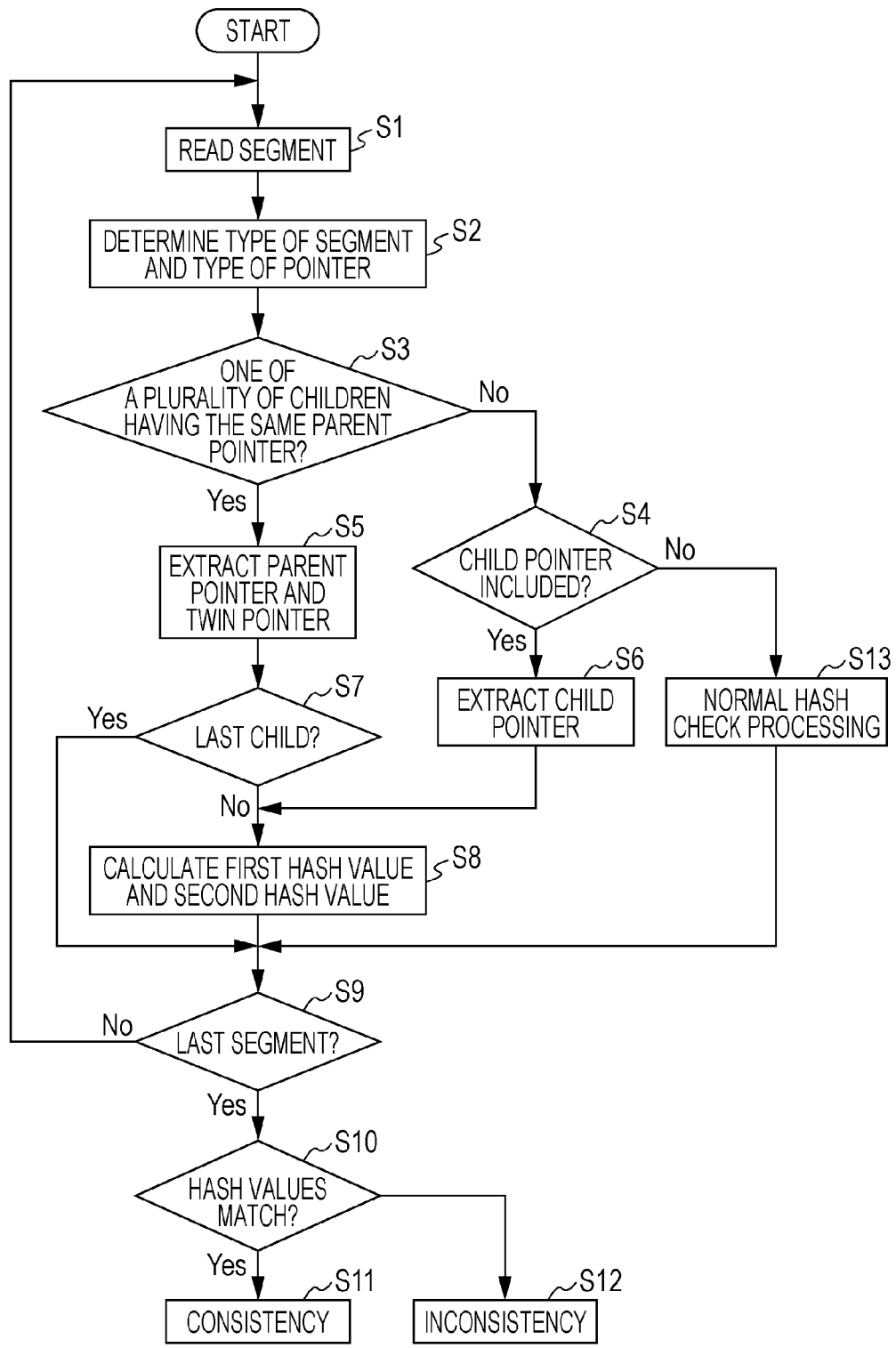
FIG. 5 is a flowchart illustrating the operation of the database management system according to the present invention.

It is possible to perform a hash check of child pointers and twin pointers by, for example, in step S8 in FIG. 5, calculating a hash value (accumulated value) of the child pointers, a hash value of the storage location addresses of the child segments pointed to by the child pointers, a hash value of the twin pointers, and a hash value of the child segments pointed to by the twin pointers, and, in step S10, checking whether or not (hash value of child pointers=hash value of storage location addresses of child segments pointed to by child pointers), and (hash value of twin pointers=hash value of child segments pointed to by twin pointers) hold. If the first hash value and the second hash value do not match although no consistency errors have been detected in this hash check, it is found that a mismatch exists between the parent pointer and the storage location address of the parent segment.

The number of times the determination result in step S3 is YES when the process proceeds from step S9 to step S10 represents the total number of child segments contemplated by the present invention. Similarly, the number of times the determination result in step S4 is YES when the process proceeds from step S9 to step S10 represents the total number of parent segments contemplated by the present invention. In addition, the number of times the determination result in step S7 is YES when the process proceeds from step S9 to step S10 represents the total number of last child segments among the child segments contemplated by the present invention. Therefore, it is possible to know the total numbers of parent segments and child segments to be processed in the present invention and the total number of last child segments to be excluded from the processing, by providing the database management system 30 in FIG. 4 with a counting unit including counters that count the number of times the process proceeds from step S3 to step S5, the number of times the process proceeds from step S4 to step S6, and the number of times the process proceeds from step S7 to step S9, respectively.

As described above, the hash check of the present invention focuses on parent-child relationships including one parent segment and a plurality of child segments each including a parent pointer pointing to the parent segment. In other cases, that is, in a case where pointers and target segments have one-to-one relationships, normal hash check processing for accumulating pointer values and the storage location addresses of target segments may be executed. This processing is indicated by, in FIG. 5, step S13 to be executed if the determination results in steps S3 and S4 are NO.

In IBM® IMS™, the above parent-child relationships can be set as physical relationships and logical relationships. A physical relationship is set when a parent segment is in the same partition or database as its child segment, the former called a physical parent and the latter called a physical child. On the other hand, a logical relationship is set when a parent segment is in a partition or database different from that of its child segment, the former called a logical parent and the latter called a logical child. The present invention is equally applicable regardless of which one a parent-child relationship is.

Figure 6:
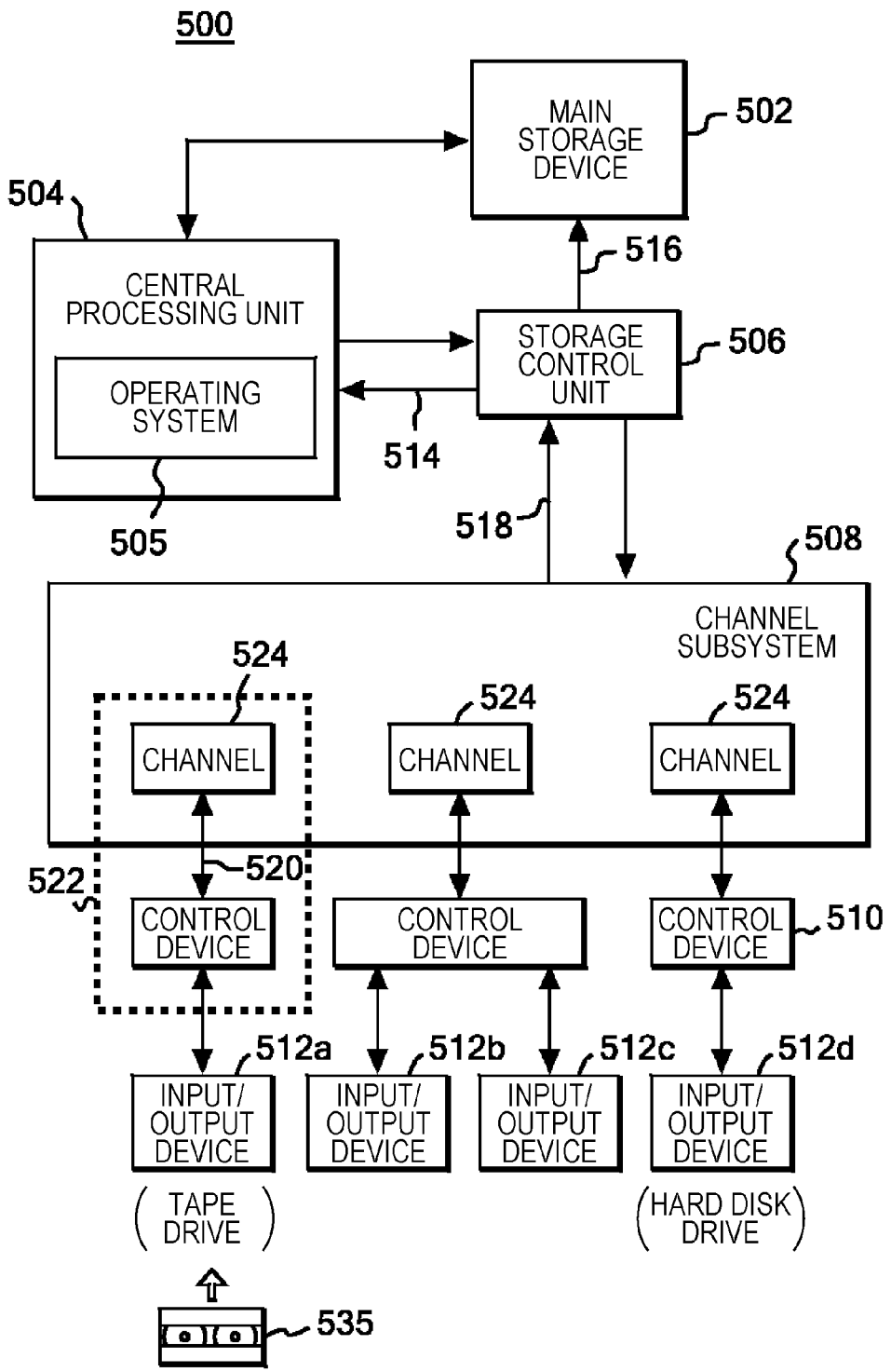
FIG. 6 is a block diagram illustrating an example of the hardware configuration of an information processing apparatus that functions as the database management system according to the present invention.

FIG. 6 illustrates an example of the hardware configuration of an information processing apparatus 500 that functions as the database management system 30. Using this figure, the hardware configuration of the information processing apparatus 500 is described as an example when the information processing apparatus 500 is a large general-purpose computer called a mainframe. The information processing apparatus 500 includes a main storage device 502, at least one central processing unit 504, a storage control unit 506, a channel subsystem 508, at least one control device 510, and one or more input/output devices 512a to 512d.

The main storage device 502 stores data and programs input from the input/output devices 512a to 512d. When an address is specified from the central processing unit 504 and the channel subsystem 508, the main storage device 502 sends the data stored in the address to the central processing unit 504 and the channel subsystem 508. The main storage device 502 is capable of reading and writing stored data at a high speed, and the high-speed reading and writing enables high-speed operation of the central processing unit 504.

The central processing unit 504 plays a key role of controlling the entirety of the information processing apparatus 500, and executes, for example, at least one operating system 505. The operating system 505 controls program execution and input/output processing in the information processing apparatus 500. For example, the operating system 505 may control the execution of another program running on the central processing unit 504, or may control data transfer at each of the input/output devices 512a to 512d.

The storage control unit 506 is connected to the central processing unit 504 via a bus 514 capable of performing bi-directional or uni-directional communication. The storage control unit 506 is further connected to the main storage device 502 via a bus 516, and is connected to the channel subsystem 508 via a bus 518. The storage control unit 506 may temporarily store, for example, an access request received from the central processing unit 504 or the channel subsystem 508 (queuing process), and transmit the access request to the main storage device 502 at a predetermined timing.

The channel subsystem 508 is connected to each of the control devices 510 via a data transfer path 520. Further, the channel subsystem 508 controls data transfer between the input/output devices 512a to 512d and the main storage device 502. Therefore, the processing load placed on the central processing unit 504 to communicate with the input/output devices 512a to 512d can be reduced, thus allowing parallel execution of the operation processing performed by the central processing unit 504 and the input and output processing performed by the input/output devices 512a to 512d, resulting in enabling the information processing apparatus 500 to be efficiently operated.

Further, the channel subsystem 508 transfers data to or from the input/output devices 512a to 512d using at least one channel path 522. Each channel path 522 has a channel 524 provided in the channel subsystem 508. Each channel path 522 also has at least one control device 510 and a data transfer path 520. Here, the data transfer path 520 may be, for example, a serial link based on ESCON® (Enterprise Systems Connection Architecture). Alternatively, the data transfer path 520 may be a parallel OEMI, or may also be a fiber channel.

The control device 510 controls at least one of the input/output devices 512a to 512d. For example, the control device 510 may control the data transfer timing for each of the input/output devices 512a to 512d. The control device 510 is connected to at least one of the input/output devices 512a to 512d via a bus 526. As an example, the control device 510 can be connected to up to 256 input/output devices.

Each of the input/output devices 512a to 512d transfers data to and from the main storage device 502 sequentially through the control device 510, the channel subsystem 508, and the storage control unit 506. Here, specifically, the input/output device 512a is a magnetic tape drive, and the input/output device 512d is a hard disk drive. Alternatively or additionally, each of the input/output devices 512a to 512d may be a punched card reader, a display, a keyboard, a printer, a communication device, a sensor, or any other storage device. As an example, at least one of the input/output devices 512a to 512d may be connected to the database 20, and may access the database 20.

A program to be provided to the information processing apparatus 500 is stored in a recording medium such as a tape recording medium 535 and is provided by a user. The program is read by the input/output device 512a, and is stored in the main storage device 502 via the channel subsystem 508. The program stored in the main storage device 502 is installed into the input/output device 512d (hard disk drive) again through the channel subsystem 508. The operations that the program causes the information processing apparatus 500 or the like to perform are as those described with reference to FIGS. 1 to 5. This program is designed to cause the information processing apparatus 500 to function as the reading unit 402, the determination unit 404, the extraction unit 406, the calculation unit 408, and the checking unit 410 described above.

The program described above may be stored in an external storage medium. In addition to a flexible disk or a CD-ROM, an optical recording medium such as a DVD or a PD, a magneto-optical recording medium such as an MD, or a semiconductor memory such as an IC card may be used as a storage medium. Alternatively, a storage device such as a hard disk or a RAM provided in a server system connected to a private communication network or the Internet may be used as a recording medium, and the program may be provided to the information processing apparatus 500 via a network.

While the present invention has been described using the embodiment, the technical scope of the present invention is not limited to the scope described in the foregoing embodiment. It is apparent to those skilled in the art that various changes or improvements can be made to the foregoing embodiment. It is apparent from the claims that such changed or improved embodiments may also fall within the technical scope of the present invention.

The invention claimed is:

1. A system for checking consistency of pointers in a hierarchical database, the system having a central processing unit configured to perform a method comprising:
   reading segment information recorded on the hierarchical database;
   determining a type of each segment and a type of a pointer included in each segment from the segment information read by the reading unit;
   in accordance with a determination result, extracting from a plurality of child segment parent pointers pointing to the same parent segment and twin pointers each pointing to the next child segment one after another starting from a specific child segment among the plurality of child segments, and extracting a child pointer from the parent segment, the child pointer pointing to the specific child segment;
   calculating a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments; and
   indicating a consistency error when the first hash value and the second hash value differ.

2. The system according to claim 1, wherein the specific child segment is the first child segment among the plurality of child segments, and each of the twin pointers points to the next child segment one after another in a forward direction starting from the first child segment.

3. The system according to claim 1, wherein the specific child segment is the last child segment among the plurality of child segments, and each of the twin pointers points to the next child segment one after another in a reverse direction starting from the last child segment.

4. The system according to claim 1, wherein all the combinations used to calculate the first hash value and the second hash value are based on the same operation.

5. The system according to claim 4, wherein the operation is addition, subtraction, multiplication, or division.

6. The system according to claim 5, wherein the first hash value is calculated by accumulating a combination of a storage location address of the parent segment and a value of the child pointer a number of times equal to the number of parent segments, and by accumulating a combination of values of a parent pointer and a twin pointer included in a child segment a number of times, excluding those included in the last child segment among the plurality of child segments, and calculates the second hash value by accumulating a combination of a storage location address of a child segment and a value of a parent pointer included in the child segment a number of times equal to the number of child segments.

7. The system according to claim 6, wherein the accumulation is executed by addition.

8. The system according to claim 6, wherein in a case where the operation is subtraction or division, the subtraction or division is executed with the order of operands for calculating the first hash value and the second hash value being the same.

9. A method for checking consistency of pointers in a hierarchical database by using a computer including a reading unit, a determination unit, an extraction unit, a calculation unit, and a checking unit, the method comprising:
   reading, by the reading unit, segment information recorded on the hierarchical database;
   determining, by the determination unit, a type of each segment and a type of a pointer included in each segment from the segment information read by the reading unit;
   in accordance with a determination result of the determination unit, extracting, by the extraction unit, from a plurality of child segment, parent pointers pointing to the same parent segment and twin pointers each pointing to the next child segment one after another starting from a specific child segment among the plurality of child segments, and extracting, by the extraction unit, a child pointer from the parent segment, the child pointer pointing to the specific child segment;
   calculating, by the calculation unit, a first hash value by a combination of a storage location address of the parent segment and a value of the child pointer and a combination of the values of the parent pointers and the twin pointers included in the child segments, and a second hash value from a combination of storage location addresses of the child segments and the values of the parent pointers included in the child segments; and
   indicating, by the checking unit, a consistency error when the first hash value and the second hash value differ.

10. A computer program product for checking consistency of pointers in a hierarchical database, the computer program product comprising:
    a non-transitory computer readable storage medium having computer readable program code embodied therewith, the computer readable program code comprising:
    computer readable program code configured for:
    reading segment information recorded on the hierarchical database;
    determining a type of each segment and a type of a pointer included in each segment from the segment information read;
    extracting from a plurality of child segments parent pointers pointing to the same parent segment and twin pointers each pointing to the next child segment one after another starting from a specific child segment among the plurality of child segments, and extracts a child pointer from the parent segment, the child pointer pointing to the specific child segment;
    calculating a first hash value by a combination of a storage location address of the parent segment and a value of the child pointer and a combination of the values of the parent pointers and twin pointers included in the child segments, and a second hash value from a combination of storage location addresses of the child segments and the values of the parent pointers included in the child segments; and
    indicating a consistency error when the first hash value and the second hash value differ.

11. The method according to claim 9, wherein the specific child segment is the first child segment among the plurality of child segments, and each of the twin pointers points to the next child segment one after another in a forward direction starting from the first child segment.

12. The method according to claim 9, wherein the specific child segment is the last child segment among the plurality of child segments, and each of the twin pointers points to the next child segment one after another in a reverse direction starting from the last child segment.

13. The method according to claim 9, wherein all the combinations used by the calculation unit to calculate the first hash value and the second hash value are based on the same operation.

14. The method according to claim 13, wherein the operation is addition, subtraction, multiplication, or division.

15. The method according to claim 14, wherein the calculation unit calculates the first hash value by accumulating a combination of a storage location address of the parent segment and a value of the child pointer a number of times equal to the number of parent segments, and by accumulating a combination of values of a parent pointer and a twin pointer included in a child segment a number of times, excluding those included in the last child segment among the plurality of child segments, and calculates the second hash value by accumulating a combination of a storage location address of a child segment and a value of a parent pointer included in the child segment a number of times equal to the number of child segments.

16. The method according to claim 15, wherein the accumulation is executed by addition.

17. The method according to claim 14, wherein in a case where the operation is subtraction or division, the calculation unit executes subtraction or division with the order of operands for calculating the first hash value and the second hash value being the same.

18. The computer program product according to claim 10, wherein the specific child segment is the first child segment among the plurality of child segments, and each of the twin pointers points to the next child segment one after another in a forward direction starting from the first child segment.

19. The computer program product according to claim 10, wherein the specific child segment is the last child segment among the plurality of child segments, and each of the twin pointers points to the next child segment one after another in a reverse direction starting from the last child segment.

20. The computer program product according to claim 10, wherein all the combinations used to calculate the first hash value and the second hash value are based on the same operation.

\* \* \* \* \*